United States Patent
Sodagar

(10) Patent No.: US 12,309,216 B2
(45) Date of Patent: May 20, 2025

(54) METHOD AND APPARATUS FOR SPLIT-RENDERING EMBEDDED IN A MEDIA STREAMING ARCHITECTURE FOR 5G NETWORKS

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/440,374

(22) Filed: Feb. 13, 2024

(65) Prior Publication Data

US 2024/0275834 A1    Aug. 15, 2024

Related U.S. Application Data

(60) Provisional application No. 63/445,652, filed on Feb. 14, 2023, provisional application No. 63/445,656, filed on Feb. 14, 2023, provisional application No. 63/445,659, filed on Feb. 14, 2023.

(51) Int. Cl.
*H04L 65/61* (2022.01)
*H04L 65/80* (2022.01)

(52) U.S. Cl.
CPC ............ *H04L 65/61* (2022.05); *H04L 65/80* (2013.01)

(58) Field of Classification Search
CPC ......... H04L 65/61; H04L 65/80; H04L 65/65; H04L 65/1063; H04L 65/612
See application file for complete search history.

(56) References Cited

U.S. PATENT DOCUMENTS

| | | | |
|---|---|---|---|
| 11,297,121 B2 * | 4/2022 | Sodagar | H04L 65/765 |
| 2008/0162713 A1 | 7/2008 | Bowra et al. | |
| 2021/0314379 A1 * | 10/2021 | Sodagar | H04L 65/762 |
| 2021/0336894 A1 | 10/2021 | Majmundar et al. | |

(Continued)

FOREIGN PATENT DOCUMENTS

WO    WO-2023207912 A1 *  11/2023    ............. G06F 9/451

OTHER PUBLICATIONS

International Search Report issued May 15, 2024 in International Application No. PCT/US 24/15704.

(Continued)

*Primary Examiner* — Oanh Duong
(74) *Attorney, Agent, or Firm* — Sughrue Mion, PLLC

(57) ABSTRACT

A method includes determining that a split management session is provisioned over a first split-rendering interface that is an extension of a M1 interface; receiving, over a second split-rendering interface that is an extension of a M4 interface, a request to split the one or more client media functions of the UE; and negotiating, over the second split-rendering interface between a split-rendering client of the UE and a split-rendering function of the 5GMS AS, a splitting of the one or more media functions, wherein the negotiating is based on (i) one or more client media capabilities of the UE determined using a third split-rendering interface and (ii) one or more network capabilities of the 5GMS AS determined using a fourth split-rendering interface between the split-rendering function and a function on the 5GMS AS indicating the one or more network capabilities.

20 Claims, 10 Drawing Sheets

(56) References Cited

U.S. PATENT DOCUMENTS

| | | | |
|---|---|---|---|
| 2021/0358219 A1* | 11/2021 | Melkote Krishnaprasad | ............... G06T 19/006 |
| 2022/0321628 A1 | 10/2022 | Rhyu et al. | |
| 2022/0369000 A1* | 11/2022 | Bouazizi | ................ H04S 7/302 |
| 2023/0176915 A1 | 6/2023 | Rhyu et al. | |
| 2023/0188768 A1* | 6/2023 | Satpute | ................... H04L 65/65 725/116 |
| 2023/0224512 A1* | 7/2023 | Wang | ..................... H04N 21/44 725/25 |
| 2023/0362257 A1 | 11/2023 | Sodagar | |
| 2024/0414415 A1* | 12/2024 | Bouazizi | ................ H04L 65/80 |

OTHER PUBLICATIONS

Written Opinion issued May 15, 2024 in International Application No. PCT/US 24/15704.

Rana A. Shaheen, et al., "A 45nm CMOS SOI, Four Element Phased Array Receiver Supporting Two MIMO Channels for 5G", University of Oulu, Finland [online], pp. 1-4, Nov. 30, 2017 (4 pages total) Retrieved from the Internet https://oulurepo.ouiu.fi/bitstream/handle/10024/22684/nbnfi-fe2018073033112.pdf?sequence=1.

* cited by examiner

METHOD AND APPARATUS FOR SPLIT-RENDERING EMBEDDED IN A MEDIA STREAMING ARCHITECTURE FOR 5G NETWORKS

CROSS-REFERENCE TO RELATED APPLICATION

This application claims priority from U.S. Provisional Application No. 63/445,659 filed on Feb. 14, 2023; U.S. Provisional Application No. 63/445,656, filed on Feb. 14, 2023; U.S. Provisional Application No. 63/445,652, filed on Feb. 14, 2023 in the United States Patent and Trademark Office, the disclosures of each of which are incorporated herein by reference in their entirety.

FIELD

The disclosure generally relates to managing processes in a $5^{th}$ generation (5G) media streaming (5GMS), and, in particular, to a method and apparatus for split-rendering embedded in a media streaming architecture for 5G networks.

BACKGROUND

The 3rd Generation Partnership Project (3GPP) defines a work item on split-rendering of media delivery services, in which the client media functions are split between the device and the network edge. Therefore, as a result of the split, the client runs lighter less demanding processes and may receive more complicated applications and services. Furthermore, the edge network decodes and partially renders received media to a simpler form, so that the client may run a lighter process. 5G augmented reality devices need to have intensive processing, including multiple parallel media decoding and media encoding, scene composition, and augmented reality rendering.

SUMMARY

According to one or more embodiments, a method is performed by at least processor for managing a splitting of one or more media functions of a client of a user equipment (UE) with a 5G media streaming (5GMS) application server (AS). The method comprises determining that a split management session is provisioned, wherein the split management session is provisioned over a first split-rendering interface that is an extension of a M1 interface; receiving, over a second split-rendering interface that is an extension of a M4 interface, a request to split the one or more client media functions of the UE; and negotiating, over the second split-rendering interface between a split-rendering client of the UE and a split-rendering function of the 5GMS AS, the splitting of the one or more media functions, wherein the negotiating is based on (i) one or more client media capabilities of the UE determined using a third split-rendering interface between the split-rendering client and a function on the UE indicating the one or more client media capabilities, and (ii) one or more network capabilities of the 5GMS AS determined using a fourth split-rendering interface between the split-rendering function and a function on the 5GMS AS indicating the one or more network capabilities.

According to one or more embodiments, an apparatus for managing a splitting of one or more media functions, comprises at least one memory configured to store program code; and at least one processor configured to read the program code and operate as instructed by the program code, the program code including: determining code configured to cause the at least one processor to determine that a split management session is provisioned, wherein the split management session is provisioned over a first split-rendering interface that is an extension of a M1 interface, receiving code configured to cause the at least one processor to receive, over a second split-rendering interface that is an extension of a M4 interface, a request to split the one or more client media functions of the UE; and negotiating code configured to cause the at least one processor to negotiate, over the second split-rendering interface between a split-rendering client of the UE and a split-rendering function of the 5GMS AS, the splitting of the one or more media functions, wherein the negotiating is based on (i) one or more client media capabilities of the UE determined using a third split-rendering interface between the split-rendering client and a function on the UE indicating the one or more client media capabilities, and (ii) one or more network capabilities of the 5GMS AS determined using a fourth split-rendering interface between the split-rendering function and a function on the 5GMS AS indicating the one or more network capabilities.

According to one or more embodiments, a non-transitory computer readable medium having instructions stored therein, which when executed by a processor cause the processor to execute a method for managing a splitting of one or more media functions of a client of a user equipment (UE) with a 5G media streaming (5GMS) application server (AS), the method comprising: determining that a split management session is provisioned, wherein the split management session is provisioned over a first split-rendering interface that is an extension of a M1 interface; receiving, over a second split-rendering interface that is an extension of a M4 interface, a request to split the one or more client media functions of the UE; and negotiating, over the second split-rendering interface between a split-rendering client of the UE and a split-rendering function of the 5GMS AS, the splitting of the one or more media functions, wherein the negotiating is based on (i) one or more client media capabilities of the UE determined using a third split-rendering interface between the split-rendering client and a function on the UE indicating the one or more client media capabilities, and (ii) one or more network capabilities of the 5GMS AS determined using a fourth split-rendering interface between the split-rendering function and a function on the 5GMS AS indicating the one or more network capabilities.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
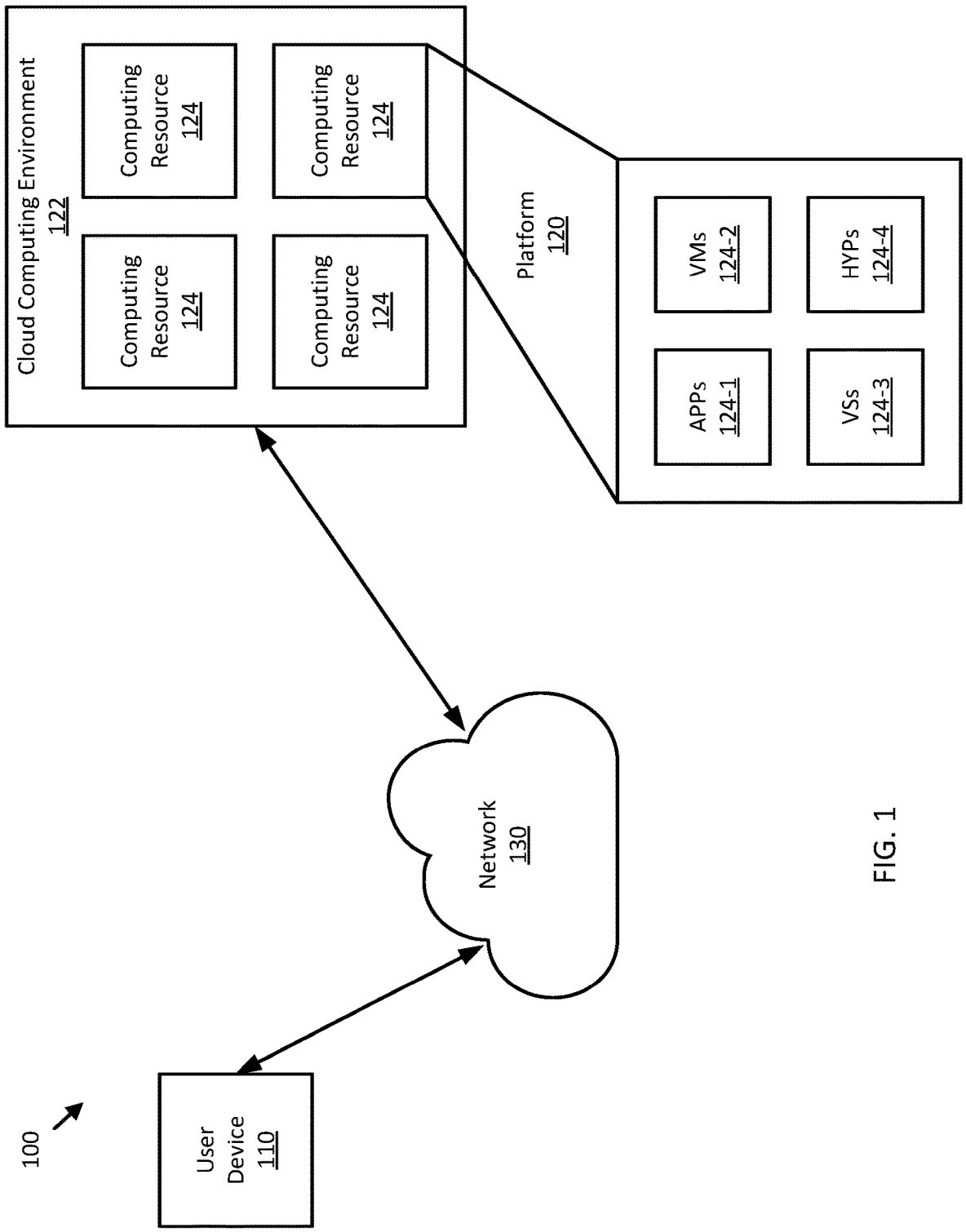
FIG. 1 is a diagram of an environment in which methods, apparatuses, and systems described herein may be implemented, according to embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications (APPs) 124-1, one or more virtual machines (VMs) 124-2, virtualized storage (VSs) 124-3, one or more hypervisors (HYPs) 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system (OS). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
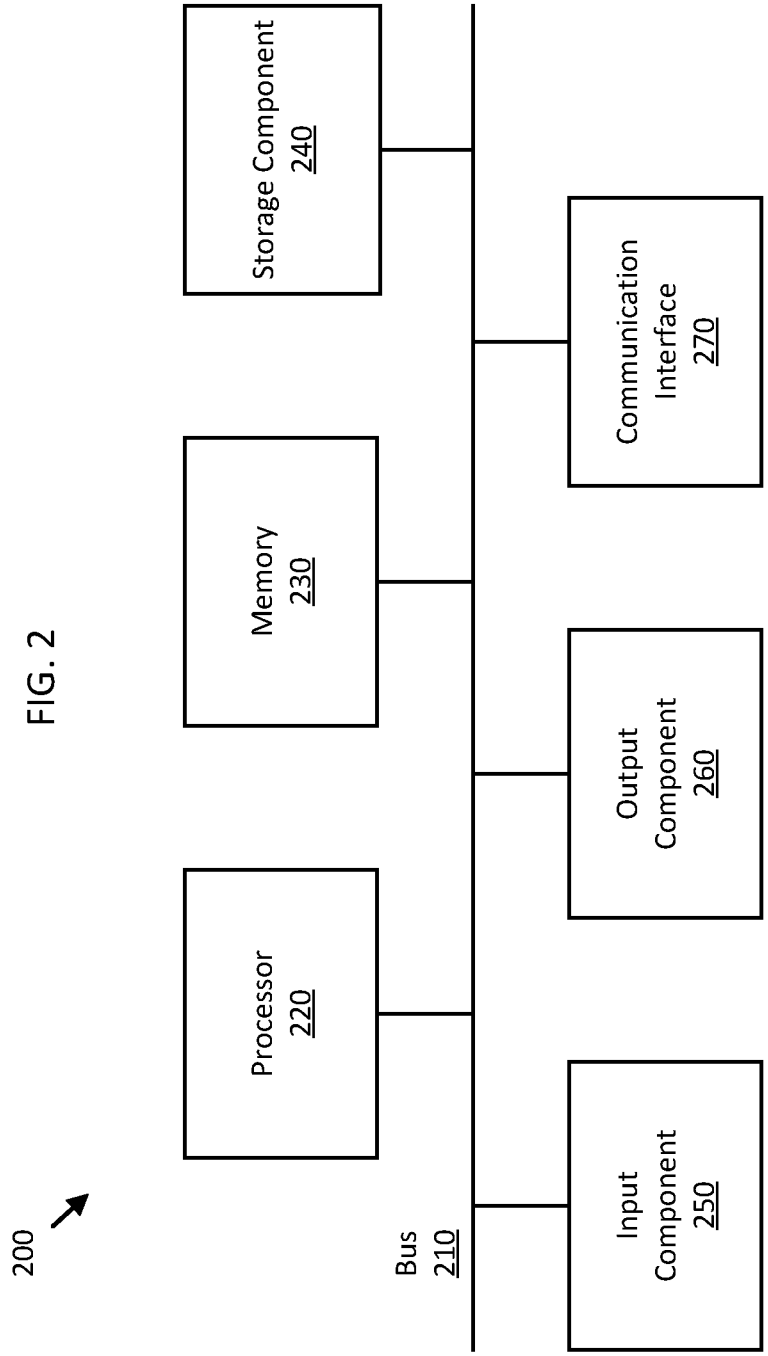
FIG. 2 is a block diagram of example components of one or more devices of FIG. 1, according to embodiments.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

A 5G media streaming (5GMS) system may be an assembly of application functions, application servers, and interfaces from the 5G media streaming architecture that support either downlink media streaming services or uplink media streaming services, or both. A 5GMS Application Provider may include a party that interacts with functions of the 5GMS system and supplies a 5GMS Aware Application that interacts with functions of the 5GMS system. The 5GMS Aware Application may refer to an application in the user equipment (UE), provided by the 5GMS Application Provider, that contains the service logic of the 5GMS application service, and interacts with other 5GMS Client and Network functions via the interfaces and application programming interfaces (APIs) defined in the 5GMS architecture. A 5GMS Client may refer to a UE function that is either a 5GMS downlink (5GMSd) Client or a 5GMS uplink (5GMSu) Client, or both.

The 5GMSd Client may refer to a UE function that includes at least a 5G media streaming player and a media session handler for downlink streaming and that may be accessed through well-defined interfaces/APIs. The 5GMSu Client may refer to an originator of a 5GMSu service that may be accessed through well-defined interfaces/APIs. A 5GMSu media streamer may refer to a UE function that enables uplink delivery of streaming media content to an Application Server (AS) function of the 5GMS Application Provider, and which interacts with both the 5GMSu Aware Application for media capture and subsequent streaming, and the Media Session Handler for media session control.

A dynamic policy may refer to a dynamic policy and charging control (PCC) rule for an uplink or downlink application flow during a media session. An egest session may refer to an uplink media streaming session from the 5GMS AS towards the 5GMSu Application Provider. An ingest session may refer to a session to upload the media content to a 5GMSd AS. A policy template may refer to a collection of (semi-static) Policy or Control Function (PCF)/Network Exposure Function (NEF) API parameters which are specific to the 5GMS Application Provider and also the resulting PCC rule. A policy template ID may identify the desired policy template, which is used by the 5GMSd Application Function (AF) to select the appropriate PCF/NEF API towards the 5G system so that the PCF can compile the desired PCC rule. The Media Player Entry may refer to a document or a pointer to a document that defines a media presentation (e.g., a media presentation description (MPD) for DASH or a uniform resource locator (URL) to a video clip file). A Media Streamer Entry may refer to a pointer (e.g., in the form of a URL) that defines an entry point of an uplink media streaming session. A presentation entry may refer to a document or a pointer to a document that defines an application presentation, such as an HTML5 document.

A Provisioning Session may refer to a data structure supplied at an interface (M1d) by a 5GMSd Application provider that configures the 5GMSd features relevant to a set of 5GMSd Aware Applications. A 5GMSd Media Player may refer to a UE function that enables playback and rendering of a media presentation based on a media play entry and exposing some basic controls such as play, pause, seek, stop, to the 5GMSd Aware Application. Server Access Information may refer to a set of parameters and addresses (including 5GMSd AF and 5GMSd AS addresses) which are needed to activate the reception of a streaming session. A Service and Content Discovery may refer to functionality and procedures provided by a 5GMSd Application Provider to a 5GMS Aware Application that enables the end user to discover the available streaming service and content offerings and select a specific service or content item for access. A Service Announcement may refer to procedures conducted between the 5GMS Aware Application and the 5GMS Application Provider such that the 5GMS Aware Application is able to obtain 5GMS Service Access Information, either directly or in the form of a reference to that information.

A third party player may refer to a part of an application that uses APIs to exercise selected 5GMSd functions to play back media content. A third party uplink streamer may refer to a part of an application that uses APIs to exercise selected 5GMSu functions to capture and stream media content.

Figure 3:
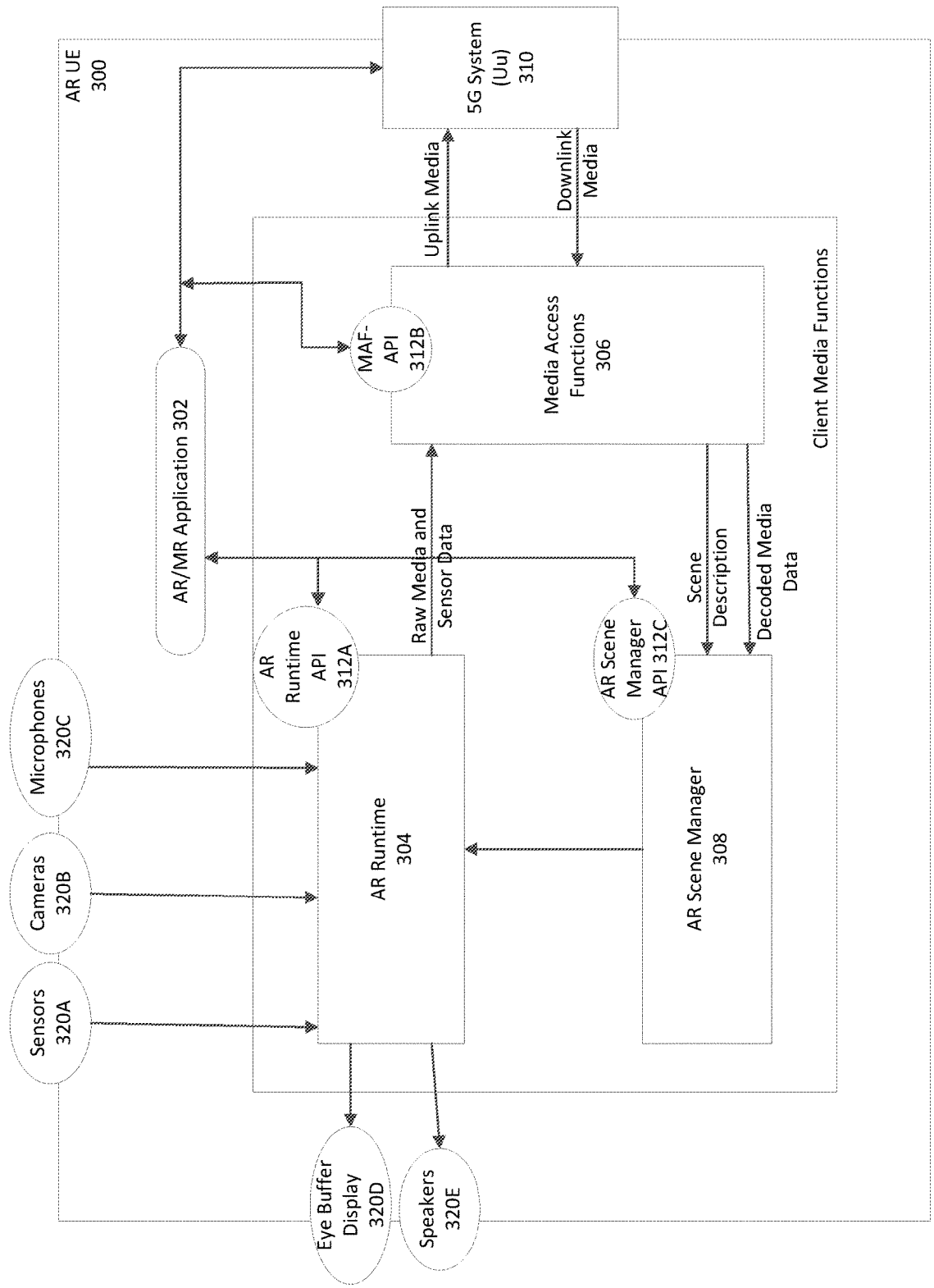
FIG. 3 is a diagram of an architecture of an Augmented Reality (AR) user equipment (UE), according to embodiments.

FIG. 3 is a diagram of an architecture of an Augmented Reality (AR) UE 300, according to one or more embodiments. The AR UE 300 may be a 5G UE with 5G connectivity provided through an embedded 5G modem and 5G system components. The AR UE 300 may include several components and user controllers for AR experiences including, but not limited to, sensors 320A, cameras 320B, microphones 320C, eye buffer display 320D, and speakers 320E.

The AR UE 300 may include AR/MR Application 302 that is configured to communicate with various device resources to provide an AR experience to a user. In one or more examples, the AR/MR Application 302 communicates with a AR Runtime 304 via a AR Runtime API 312A, with a Media Access Functions (MAF) via a MAF-API 312B, and a AR Scene Manager 308 via a AR Scene Manager API 312C. These APIs enable the AR/MR Application 302 to discover and query the media capabilities in terms of support as well as available resources at runtime.

In one or more examples, when the AR/MR application 302 is running, the downlink media flows from a 5G System 310 to the MAF 306 in a compressed form, and then from the MAF 306 to the AR Scene Manger 308 in a decoded form. The MAF 306 may further provide a scene description to the AR Scene Manager 308. In one or more examples, in parallel, the AR UE 300 is configured to establish an uplink data flow from the AR Runtime 304 to the MAF 306, where raw media and sensor data may be in an uncompressed form, and then from the MAF 306 to the 5G System 310, where the MAF 306 may have compressed the data in order to facilitate an expected transmission over the network.

Figure 4A:
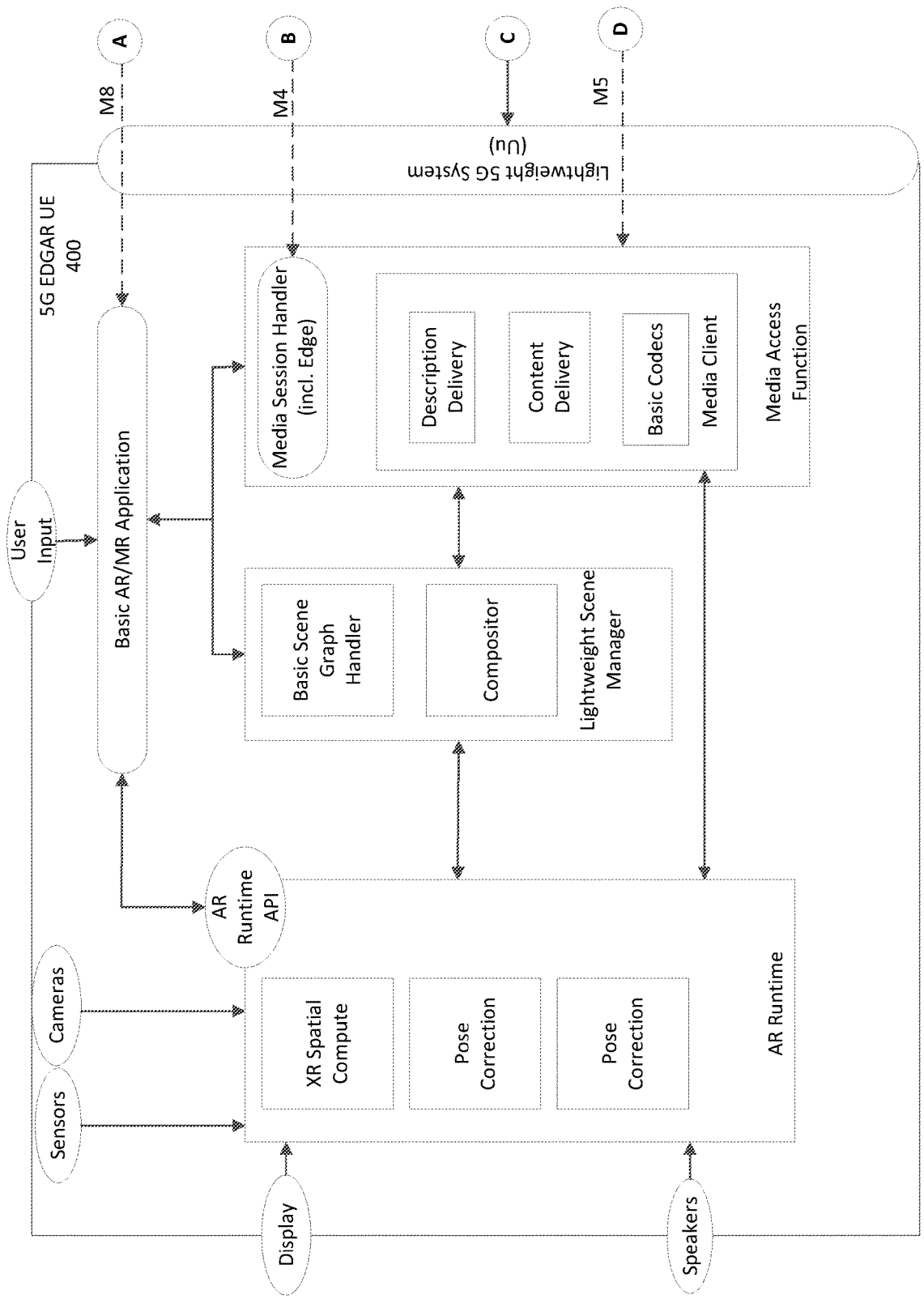
FIGS. 4A and 4B is a diagram of an architecture of a 5G Standalone EDGe-Dependent AR (5G_STAR EDGAR) UE, according to embodiments.
Figure 4B:
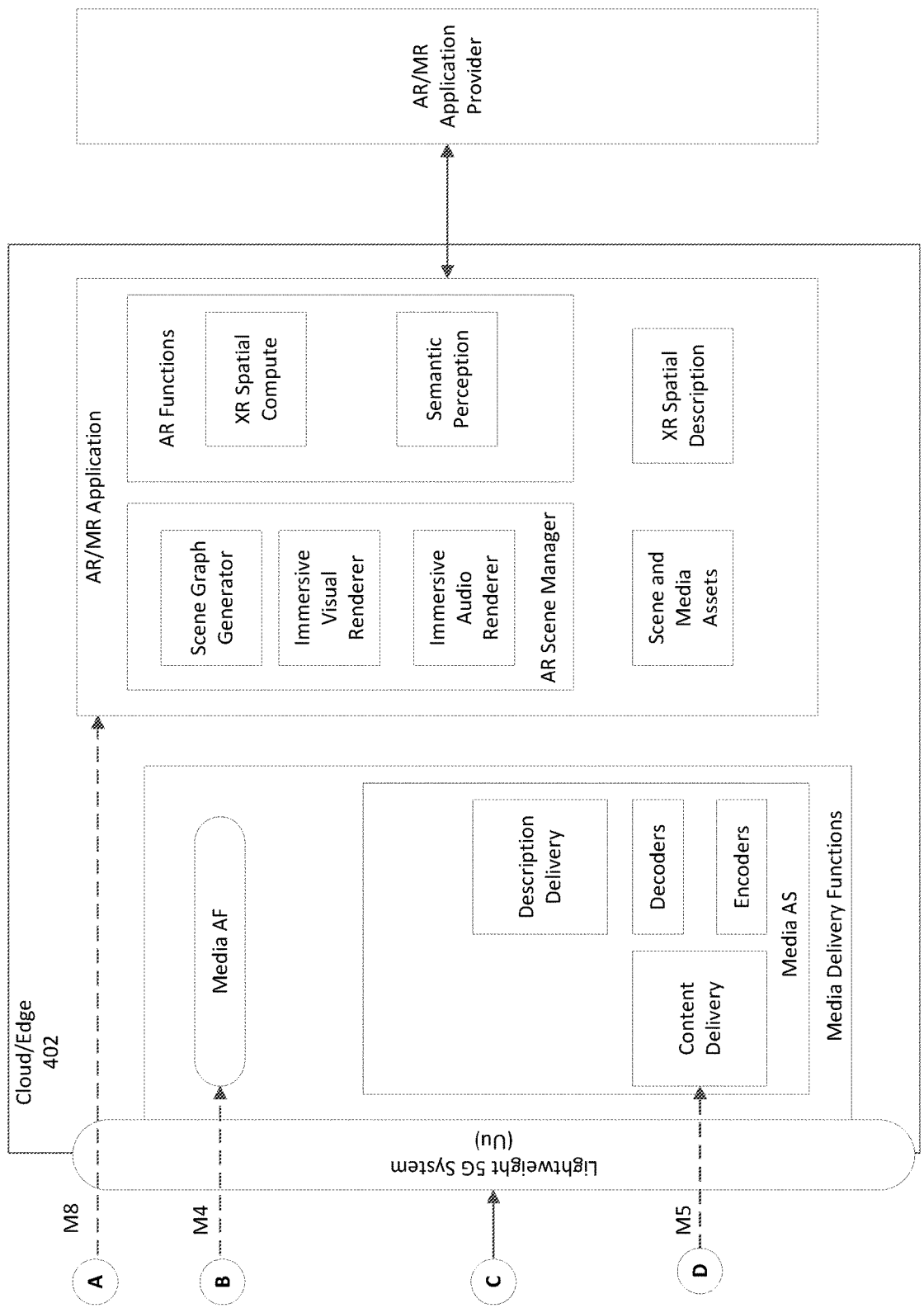

When an Application and/or an Application Service Provider decides to run the client media function in the split-rendering fashion, this functionality is replaced with two new modules: an edge-dependent light media service client, and a media processing application running on 5GMS AS. In one or more examples, a client media function may be an application or one or more tasks to be executed by a client device such as a UE. FIGS. 4A and 4B illustrate an example of a media delivery architecture having a 5G EDGAR UE 400 and a cloud/edge 402 for implementing a split. However, the 3GPP SR_MSE does not specify an architecture or process for performing split-rendering.

Figure 5:
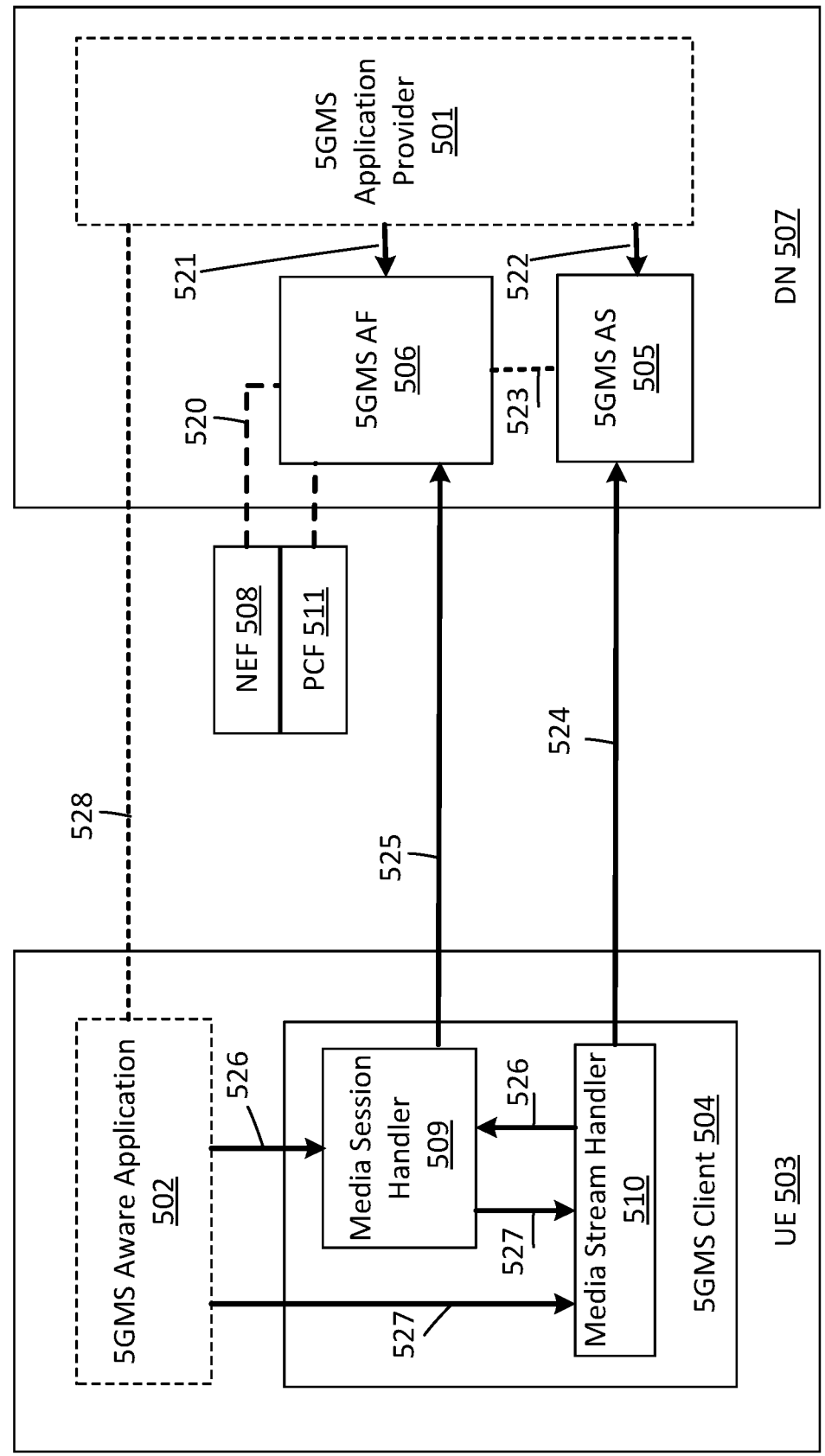
FIG. 5 is a diagram of a media architecture for media streaming, according to embodiments.

FIG. 5 is a diagram of a media architecture 500 for media uplink streaming according to embodiments. A 5GMS Application Provider 501 may use 5GMS for streaming services. In one or more examples, a streaming service may be a live video streaming session using a social medial platform. The 5GMS Application Provider 501 may be implemented as a server. The 5GMS Application Provider 501 may provide a 5GMS Aware Application 502 on a UE 503 to make use of 5GMS Client 504 and network functions using interfaces and APIs defined in 5GMS. A 5GMS application server (AS) 505 may be an AS dedicated to 5G Media Streaming. The 5GMS Client 504 may be an internal function of the UE 503 dedicated to 5G Media Streaming.

A 5GMS application function (AF) 506 and the 5GMS AS 505 may be Data Network (DN) 507 functions. The 5GMS AF 506 may be implemented as a server. Functions in trusted DNs may be trusted by the operator's network. Therefore, AFs in trusted DNs may directly communicate with some or all 5G Core functions. Functions in external DNs may only communicate with 5G Core functions via a network exposure function (NEF) 508 using link 520. The NEF 508 facilitates secure access to exposed network services and capabilities of the 5G network.

The media architecture 500 may connect UE 503 internal functions and related network functions for 5G Media Streaming. Accordingly, the media architecture 500 may include a number of functions. For example, the 5GMS Client 504 on UE 503 may be an originator of a 5GMS service that may be accessed through interfaces/APIs. The 5GMS Client 504 may include two sub-functions, a Media Session Handler 509 and a Media Stream Handler 510. The Media Session Handler 509 may communicate with the 5GMS AF 506 in order to establish, control and support the delivery of a media session. The Media Session Handler 509 may expose APIs that may be used by the 5GMS Aware Application 502. The Media Streamer 510 may communicate with 5GMS AS 505 to stream the media content and provide a service to the 5GMS Aware Application 502 for media capturing and streaming, and the Media Session Handler 509 for media session control. The 5GMS Aware Application 502 may control the 5GMS Client 504 by implementing external application or content service provider specific logic and enabling the establishment of a media session. The 5GMS AS 505 may host 5G media functions and may be implemented as a content delivery network (CDN), for example. The 5GMS Application Provider 501 may be an external application or content specific media functionality (e.g., media storage, consumption, transcoding and redistribution) that uses 5GMS to stream media from the 5GMSu Aware Application 502. The 5GMS AF 506 may provide various control functions to the Media Session Handler 509 on the UE 503 and/or to the 5GMSu Application Provider 501. The 5GMSu AF 506 may relay or initiate a request for a different policy control function (PCF) 511 treatment or interact with other network functions.

The media architecture 500 may include a number of different interfaces. For example, link 521 may relate to M1, which may be a 5GMS Provisioning API exposed by 5GMS AF 506 to provision usage of media architecture 500 and to obtain feedback. Link 522 may relate to M2, which may be a 5GMS Publish API exposed by 5GMS AS 505 and used when the 5GMS AS 505 in a trusted DN, such as DN 507, is selected to receive content for streaming service. Link 523 may relate to M3, which may be an internal API used to exchange information for content hosting on 5GMS AS 505 within a trusted DN such as DN 507. Link 524 may relate to M4, which may be a Media Streaming API exposed by the 5GMS AS 505 to the Media Streamer 510 to stream media content. Link 525 may relate to M5, which may be a Media Session Handling API exposed by 5GMS AF 505 to Media Session Handler for media session handling, control, and assistance that also include appropriate security mechanisms (e.g., authorization and authentication). Link 526 may relate to M6, which may be a UE 503 Media Session Handling API exposed by Media Session Handler 509 to 5GMS Aware Application 502 to make use of 5GMS functions. Link 527 may relate to M7, which may be a UE Media Streamer API exposed by Media Streamer 510 to the 5GMS Aware Application 502 and the Media Session Handler 509 to make use of the Media Streamer 510. Link 528 may relate to M8, which may be an Application API which is used for information exchange between 5GMS Aware Application 502 and 5GMS Application Provider 501, for example to provide service access information to the 5GMS Aware Application 502. The UE 503 may also be implemented in a self-contained manner such that interfaces M6 526 and M7 527 are not exposed. The architecture illustrated in FIG. 5 does not include split-rendering functionality.

Figure 6:
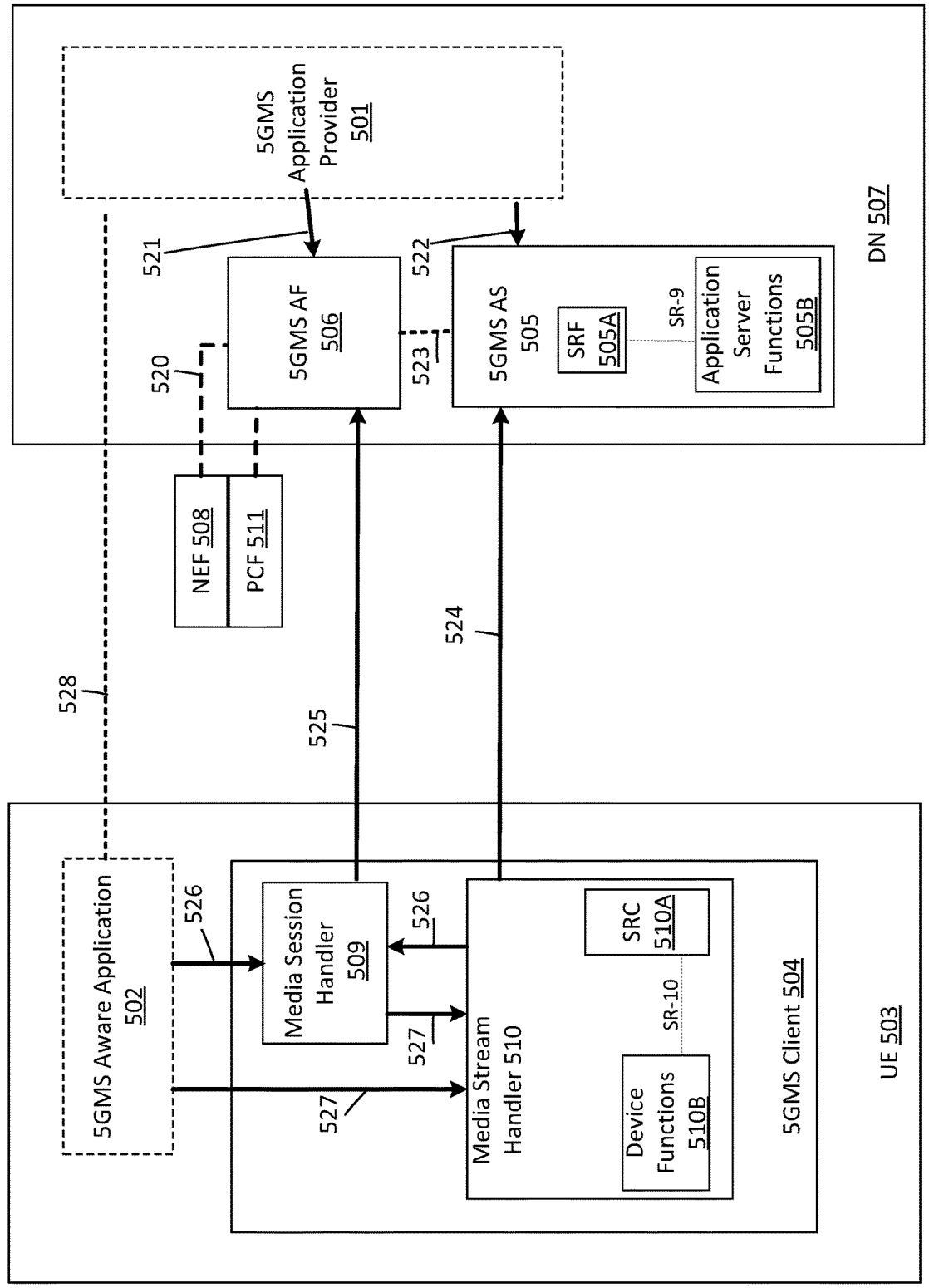
FIG. 6 is a diagram of a split management architecture, according to embodiments.

Embodiments of the present disclosure are directed to a split management architecture that is embedded in the 5G media streaming architecture as illustrated in FIG. 6. To manage the split, several entities in the device and network need to interact with each other.

FIG. 6 illustrates an example 5G media streaming architecture having a split management architecture embedded therein.

According to one or more embodiments, a Split-Rendering Client (SRC) 510A is added to the Media Stream Handler 510. The SRC may be configured to acquire UE media capabilities and negotiate with the 5GMS AS 505 to agree on the split-rendering process at the 5GMS AS 505.

In one or more examples, a Device Media Functions (DMF) 510B is added to the Media Stream Handler 510. The DMF 510 may include one or more media processing functions running on the UE 503.

According to one or more embodiments, a Split-Rendering-Function (SRF) 505A is added to 5GMS AS 505. The SRF 505A may be configured to acquire the 5GMS AS processing capabilities and negotiates with the UE 503 to configure the split-rendering process at the 5GMS AS 505.

In one or more examples, an Application Server Functions (ASF) 505B is added to the 5GMS AS 505. The ASF 505B may include one or more functions running the split-rendering process on 5GMS AS 505. The ASF 505B may provide its processing capabilities to the SRF.

The above-mentioned entities may communicate with each other using the following disclosed interfaces. In one or more examples, the interaction between the above functions and other functions in the 5GMS architecture may be either internal to the device or server or defined as part of the 5GMS interfaces.

In one or more examples, the communication between the SRC 510A and the SRF 505A may be supported as part of an extended M4 interface. The extension to this interface may be referred to as SR-4.

In one or more examples, the communication between the SRF 505A and the 5GMS-Aware Application 502 may be supported as part of an extended M7 interface. The extension to this interface may be referred to as SR-7.

In one or more examples, the 5GMS Application Provider 501 may provision the split-rendering through an extended M1 interface, while the 5GMS AF 506 communicates the provisioning to the SRF 505B through an extended M3 interface. The extensions to the M1 and M3 interfaces for split-rendering may be referred to as SR-1 and SR-3, respectively.

In one or more examples, an interface between the SRF 505A and the ASF 505B may be referred to as SR-9 and may be used to retrieve the capabilities of the ASF 505B by the SRF 505A.

In one or more examples, the interface between SRC 510A and DMF 510B may be referred to as SR-10 and may be used to retrieve the media capabilities of the UE 503 by the SRC 510A.

In one or more examples, one of two different deployment scenarios for the start of split negotiation may be utilized. In one or more examples, the split negotiation may be client-initiated. In a client-initiated split negotiation, the 5GMS Aware Application 502 may request the SRC 510A to initiate the split negotiation. The SRC 510A may negotiate with the SRF 505A to find the best or optimal split. In one or more examples, the best or optimal split may be a split of an application that minimizes usage of resources of the UE 503 and the 5GMS AS 505. The 5GMS Aware Application 502 may also authorize the SRC 510A to renegotiate the split during a media delivery session due to a change in the client's available resources.

In one or more examples, the split negotiation may be network-initiated. In a network-initiated split the 5GMS Application Provider 501 may request the SRF 505A to initiate the split negotiation. The SRF 505A may offer the possibility to the SRC 510A and starts negotiating to find the best split. The 5GMS Application Provider 501 may also authorize the SRF 505A to renegotiate the split during the session due to a change in available resources of the 5GMS AS 505.

According to one or more embodiments, the split management may be static or dynamic. In one or more examples, a static split management may be performed where the split management architecture is run before starting a media delivery session or when a non-split-rendering media delivery session is decided to be split. In a static split management, the splitting of the client media functions occurs only once before or during the media delivery session.

In one or more examples, a dynamic split management may be performed where the split management architecture is run in parallel to the media delivery session. In a dynamic split management, the performance of the client and 5GMS AS 505 may be monitored during the media delivery session and a new split may be performed depending on the condition of the client and/or the 5GMS AS 505. In one or more examples, the performance of the client may be determined based on a workload of the client exceeding a workload threshold or a processing speed of the client decreasing below a processing speed threshold. In one or more examples, the performance of the 5GMS AS 505 may be determined based on a workload of the 5GMS AS 505 exceeding a workload threshold or a processing speed of the 5GMS AS 505 decreasing below a processing speed threshold.

The split management architecture has several advantages. For example, separation of the split management from media delivery and edge management is achieved where split management may be run in parallel using the above-discussed SR interfaces.

The embodiments of the present disclosure provide interfaces for provisioning a split management session, the interaction between client and network, Application and client, and network split function and the network application server. These APIs (e.g., interfaces) provide simple interaction and independence from other architectures (e.g., media delivery and edge management) and simplify the parallel existence of these architectures.

The embodiments of the present disclosure provide an architecture that is combined with the 5G media streaming architecture. Therefore, the new interfaces may be embedded with the existing 5G media streaming architecture. For example, the SR-1 interface may be embedded in the M1 interface, the SR-3 interface may be embedded in the M3 interface, and the SR-4 interface may be embedded in the M4 interface.

The embodiments of the present disclosure also define two new interfaces: SR-9 and SR-10, which are unique for the split-rendering.

The embodiments of the present disclosure provide a control panel architecture. The entities in the control plane architecture only interact in the control plane and therefore, they are kept separated from the media plane.

The embodiments of the present disclosure provide initiation of split management by the client or by the network where either entity can start the negotiation for splitting.

The embodiments of the present disclosure provide both static and dynamic splitting with a single architecture. The same solution may be used for both cases.

Figure 7:
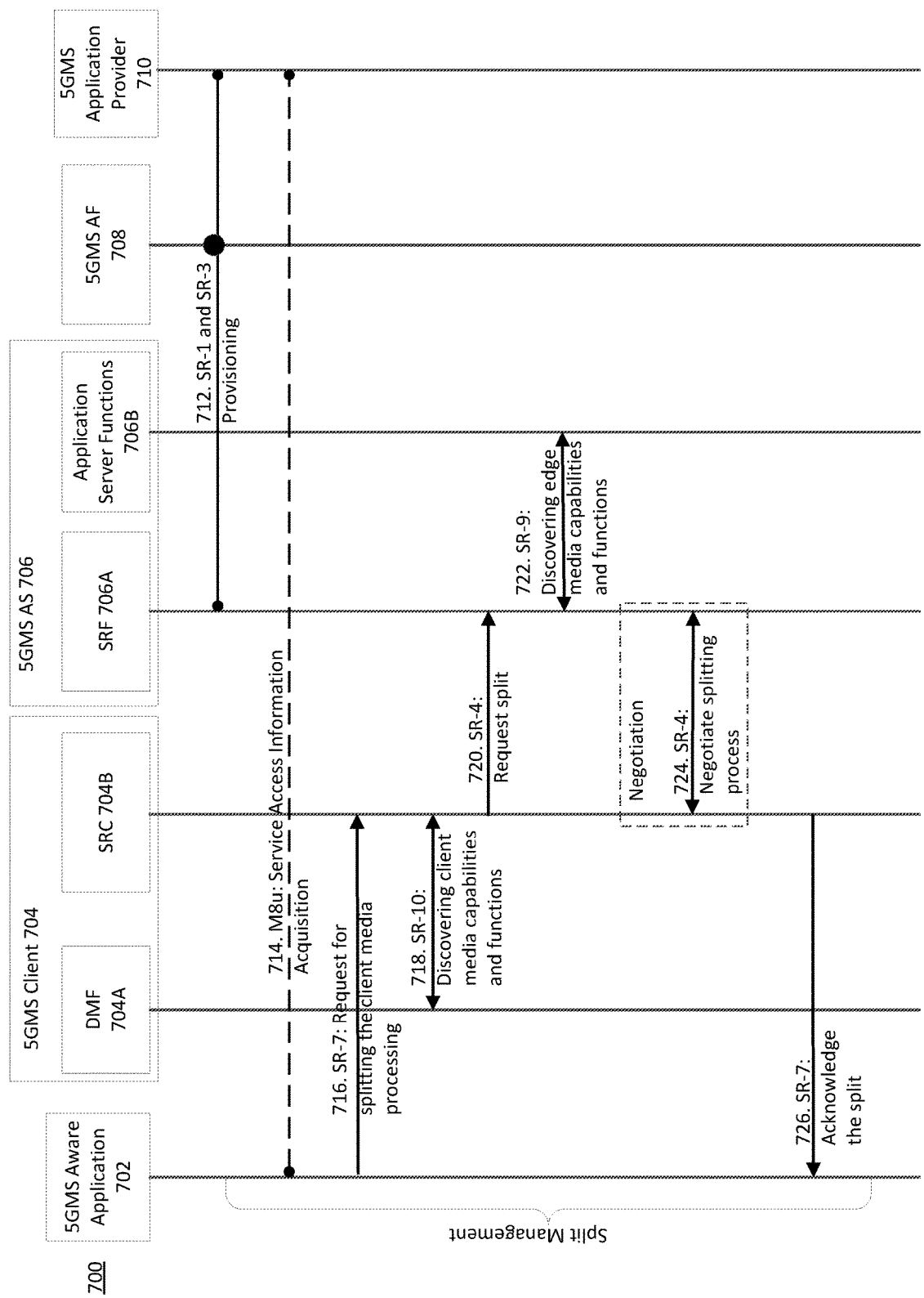
FIG. 7 is a diagram of an operation flow of a client-driven split management process, according to embodiments.

FIG. 7 illustrates a diagram of an operation flow 700 for setting up split-rendering by a client. The operation flow 700 may be performed between a 5GMS Aware Application 702, a 5GMS Client 704 having an DMF 704A and an SRC 704B, a 5GMS AS 706 having an SRF 706A and an ASF 706B, and a 5GMS Application Provider 710. The 5GMS Aware Application 702 may correspond to the 5GMS Aware Application 502 (FIG. 6). The 5GMS Client 704 may correspond to the 5GMS Client 504 (FIG. 6). The DMF 704A may correspond to the DMF 510B (FIG. 6). The SRC 704B may correspond to the SRC 510A (FIG. 6). The 5GMS AS 706 may correspond to the 5GMS AF 506 (FIG. 6). The SRF 706A may correspond to the SRF 505A. The ASF 706B may correspond to the ASF 505B. The 5GMS Application Provider 710 may correspond to the Application Provider 510 (FIG. 6).

The operation flow 700 may start at operation 712 where the 5GMS Application Provider 710 requests the SRF 706A to provision a split management session. This operation may be performed using the SR-1 and SR-3 interfaces. For example, the 5GMS Application Prover 710 may provision the split management session via the SR-1 interface, and the 5GMS AF 708 may communicate the provisioning to the SRF 706A via the SR-3 interface.

In operation 714, the split management session is announced to the 5GMS Aware Application 702 as part of the Service Access Information. The announcement may be performed over the M8u interface.

In operation 716, the 5GMS Aware Application 702 requests a split of the client media functions from the SRC 704B. The request in operation 716 may be performed over the SR-7 interface.

In operation 718, the SRC 704B inquires the DMF 704A to discover the client's media capabilities. For example, the SRC 704B may transmit a request to the DMF 704A, where the DMF 704A responds with a message indicating one or more device capabilities of the client. The messages of operation 718 may be transmitted over the SR-10 interface.

In operation 720, the SRC 704B may request the SRF 706A for a split of the client media functions. The request may be transmitted over the SR-4 interface.

In operation 722, the SRF 706A may inquire the ASF 706B about the capabilities of the ASF 706. The SRF 706A may transmit a message to the ASF 706B, where the ASF 706B responds with a message indicating the capabilities of the ASF 706B. The messages of operation 722 may be transmitted over the SR-9 interface.

In operation 724, the SRC 704B and the SRF 706B negotiate on the acceptable capabilities for the device, and agree on the split option. The negotiation between the SRC 704B and the SRF 706B may be based on the client capabilities discovered in operation 718, and the capabilities of the 5GMS AS 706 discovered in operation 722. The negotiation may be performed over the SR-4 interface. In one or more examples, if an application to be executed includes tasks A, B, C, D, and E, the tasks may be split between the client and the network based on the negotiation, where the client performs tasks A and B, and the network may perform tasks C, D, and E.

In operation 726, the SRC acknowledges to the 5GMS Aware Application 702 that the split-rendering on the network is running. The acknowledgement may be transmitted over the SR-7 interface.

Figure 8:
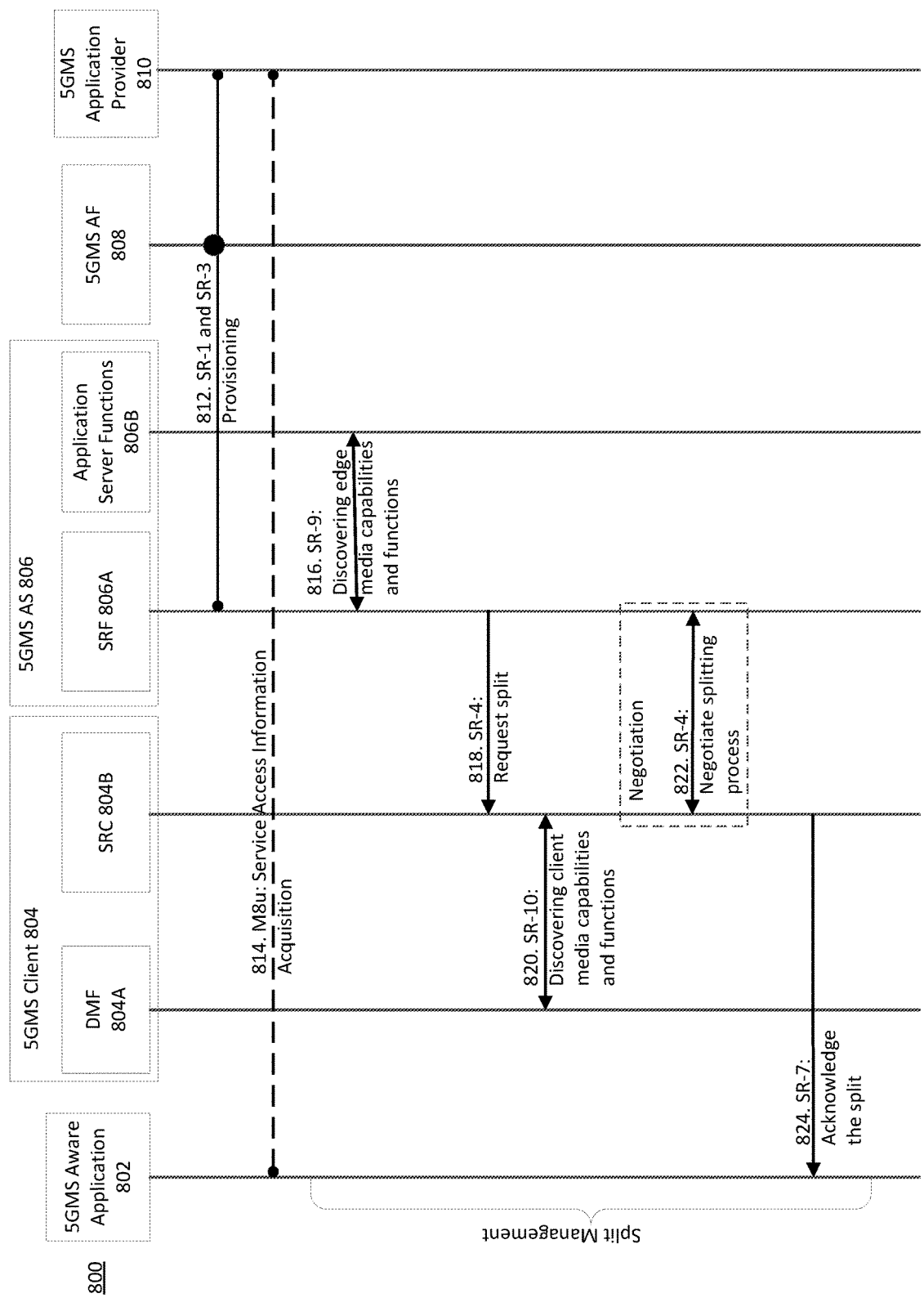
FIG. 8 is a diagram of an operation flow of a network-driven split management process, according to embodiments.

FIG. 8 illustrates a diagram of an operation flow 800 for setting up split-rendering by a network.

The operation flow 800 may be performed between a 5GMS Aware Application 802, a 5GMS Client 804 having an DMF 804A and an SRC 804B, a 5GMS AS 806 having an SRF 806A and an ASF 806B, and a 5GMS Application Provider 810. The 5GMS Aware Application 802 may correspond to the 5GMS Aware Application 502 (FIG. 6). The 5GMS Client 804 may correspond to the 5GMS Client 504 (FIG. 6). The DMF 804A may correspond to the DMF 510B (FIG. 6). The SRC 804B may correspond to the SRC 510A (FIG. 6). The 5GMS AS 806 may correspond to the 5GMS AF 506 (FIG. 6). The SRF 806A may correspond to the SRF 505A. The ASF 806B may correspond to the ASF 505B. The 5GMS Application Provider 810 may correspond to the Application Provider 510 (FIG. 6).

The operation flow 800 may start at operation 812 where the 5GMS Application Provider 810 requests the SRF 806A to provision a split management session. This operation may be performed using the SR-1 and SR-3 interfaces. For example, the 5GMS Application Prover 810 may provision the split management session via the SR-1 interface, and the 5GMS AF 808 may communicate the provisioning to the SRF 806A via the SR-3 interface.

In operation 814, the split management session is announced to the 5GMS Aware Application 802 as part of the Service Access Information. The announcement may be performed over the M8u interface.

In operation 816, the SRF 806A may inquire the ASF 806B about the capabilities of the 5GMS AS 806. The SRF 806A may transmit a message to the ASF 806B, where the ASF 806B responds with a message indicating the capabilities of the 5GMS AS 806. The messages of operation 816 may be transmitted over the SR-9 interface.

In operation 818, the SRF 806A requests the SRC 804B for a split of the client media functions. The request may be transmitted over the SR-4 interface.

In operation 820, the SRC 804B inquires the DMF 804A to discover the client's media capabilities. For example, the SRC 804B may transmit a request to the DMF 804A, where the DMF 804A responds with a message indicating one or more device capabilities of the client. The messages of operation 820 may be transmitted over SR-10.

In operation 822, the SRC 804B and SRF 806A negotiate on the acceptable capabilities for the device, and agree on the split option. The negotiation between the SRC 804B and the SRF 806A may be based on the client capabilities discovered in operation 820, and the capabilities of the 5GMS AS 806 discovered in operation 816. The negotiation may be performed over the SR-4 interface.

In operation 824, the SRC 804B acknowledges to the 5GMS Aware Application 802 that the split-rendering on edge is running. The acknowledgement may be transmitted over the SR-7 interface.

The embodiments of the present disclosure provide a simple negotiation scheme between the SRC 510A and the SRF 505A for the split-rendering configuration. In the simple split-rendering negotiation, the SRF 505A provides the SRC 510A with the capabilities of the device, and if the SRC 510A can accommodate the split-rendering processing that addresses the device, the configuration is confirmed. Based on these embodiments, no back-and-forth negotiation is occurring and the SRC 510A may be responsible to make the decision regarding the confirmation in one or more examples.

In one or more examples, the split-rendering includes (1) The 5GMS Application Provider 501 provisions the mobile network operation (MNO) to perform split-rendering (SR-1), (2) the address of the SRF 505A is provided through M8 or M5 to the UE 503, (3) the SRC 510A provides the SRF 505A with the UE's capabilities through the SR-4 interface, and (4) if acknowledged, the SRC 510A responds to the SRF 505A with the updated media entry; otherwise, the SRC 510A rejects the request.

In one or more examples, the split-rendering provisioning process may rely on one or more RESTful APIs that include one or more split-rendering provisioning procedures and one or more split-rendering provisioning APIs.

In one or more example, the procedures used by the 5GMS Application Provider 501 and the 5GMS AF 506 to provision for the split-rendering process may be performed over the M1 interface.

In one or more examples, the provisioning of the split-rendering process includes a create split-rendering configuration procedure. This procedure may be used by the 5GMS Application Provider 501 to create a new Split-Rendering Configuration. The 5GMS Application Provider may use a HTTP POST method for this purpose and the request message body may include a SplitRenderingConfiguration resource. If the procedure is successful, the 5GMS AF 506 may generate a resource identifier representing the new Split-Rendering Configuration. In this case, the 5GMS AF may respond with a 201 (Created) HTTP response message and may provide the URL to the newly created resource in a Location header field. The response message body may include a SplitRenderingConfiguration resource that represents the current state of the Split-Rendering Configuration, including any fields set by the 5GMS AF 506. If the procedure is not successful, the 5GMS AF 506 shall provide an error code.

In one or more examples, the provisioning of the split-rendering process includes a read split-rendering configuration properties procedure. This procedure may be used by the 5GMS Application Provider to obtain the properties of an existing Split-Rendering resource from the 5GMS AF 506. The HTTP GET method may be used for this purpose. If this procedure is successful, the 5GMS AF 506 may respond with a 200 (OK) response message that includes the SplitRenderingConfiguration resource in the response message body. If the procedure is not successful, the 5GMS AF 506 may provide an error code.

In one or more examples, the provisioning of the split-rendering process includes an update split-rendering configuration properties procedure. The update operation may be invoked by the 5GMS Application Provider 501 to modify the properties of an existing SplitRenderingConfiguration resource. In one or more examples, all writeable properties except domainNameAlias may be updated. The HTTP PATCH or HTTP PUT methods may be used for the update operation. If the procedure is successful, the 5GMS AF 506 may respond with a 200 (OK) and provide the content of the resource in the response, confirming the successful update operation. If the procedure is not successful, the 5GMSd AF shall provide an error code.

In one or more examples, the provisioning of the split-rendering process includes a destroy split-rendering configuration procedure. This operation may used by the 5GMS Application Provider 501 to destroy a Split-Rendering Configuration resource and to terminate the related distribution. The HTTP DELETE method may be used for this purpose. As a result, the 5GMS AF 506 may release any associated network resources, purge any cached content, and delete any corresponding configurations. If the procedure is successful, the 5GMS AF shall respond with a 200 (OK) response message. If the procedure is not successful, the 5GMS AF 506 may provide an error code.

In one or more examples, the split-rendering provisioning procedures may use one or more split-rendering provisioning APIs. These provisioning procedures may specify the API that a 5GMS Application Provider 501 uses at interface M1 to provision and manage 5GMS AS Split-Rendering Function by interacting with the 5GMS AF 506. Each configuration may be represented by a SplitRenderingConfiguration. The data model is specified below. The RESTful resources for managing Split-Rendering Configurations are also specified below.

In one or more examples, the Split-Rendering Provisioning API may be accessible through the following URL base path:

{apiRoot}/3gpp-m1/{apiVersion}/provisioning-sessions/{provisioningSessionId}/

Table 1 below specifies the examples operations and the corresponding HTTP methods that are supported by this API. In each case, the Provisioning Session identifier may be substituted into (provisioningSessionId) in the above URL template and the sub-resource path specified in the second column shall be appended to the URL base path.

TABLE 1

Operations supported by the Split-Rendering Provisioning API

| Operation | Sub-resource path | Allowed HTTP method(s) | Description |
| --- | --- | --- | --- |
| Create Split-Rendering Configuration | content-hosting-configuration | POST | Used to create a Split-Rendering Configuration resource. |
| Retrieve Split-Rendering Configuration | | GET | Used to retrieve an existing Split-Rendering Configuration. |
| Update Split-Rendering Configuration | | PUT, PATCH | Used to modify an existing Split-Rendering Configuration. |
| Delete Split-Rendering Configuration | | DELETE | Used to delete an existing Split-Rendering Configuration. |
| Purge Split-Rendering Configuration cache | content-hosting-configuration/purge | POST | This operation is used to invalidate some or all cached media resources associated with this Split-Rendering Configuration. |

An example data model for the SplitRenderingConfiguration resource is specified in Table 2.

TABLE 2

Definition of SplitRenderingConfiguration resource

| Property name | Data Type | Cardinality | Description |
| --- | --- | --- | --- |
| Name | String | 1 ... 1 | A name for this Split Rendering Configuration. |
| Status | Boolean | 1 ... 1 | Indicates whether the 5GMS AS shall use Split-Rendering if possible |
| Configuration | Object | 1 ... 1 | Describes the split-rendering configuration currently used by the 5GMS AS |

In one or more examples, a data model is specified for split-rendering in service access information. The data model may be used for a SR-5 interface. In one or more examples, a property may be included in the ServiceAccessInformation resource to signal the availability of split-rendering service in the 5GMS AS 506. This property may indicate the protocol and the address of the SRF 505A, as illustrated in Table 3.

TABLE 3

| Split-Rendering property in ServiceAccessInformation resource | | | | | |
|---|---|---|---|---|---|
| Property name | Type | Cardinality | Usage | Description | Applicability |
| provisioningSessionId | ResourceId | 1 . . . 1 | RO | Unique identification of the M1 Provisioning Session. | All types |
| provisioningSessionType | ProvisioningSessionType | 1 . . . 1 | RO | The type of Provisioning Session. | All types. |
| streamingAccess | Object | 0 . . . 1 | RO | | downlink |
| clientConsumptionReportingConfiguration | Object | 0 . . . 1 | RO | | downlink |
| dynamicPolicyInvocationConfiguration | Object | 0 . . . 1 | RO | | downlink, uplink |
| networkAssistanceConfiguration | Object | 0 . . . 1 | RO | | downlink, uplink |
| splitRenderingConfiguraturation | Object | 0 . . . 1 | RO | | downlink, uplink |
| srfProtocol | String | 0 . . . 1 | RO | The supported protocol. The default is HTTP. | |
| srfAddress | String | 0 . . . 1 | RO | The address of the SRF. The default is URL. | |
| bodyFormat | String | 0 . . . 1 | RO | The format of the capabilities. The default is JSON. | |

NOTE:
In deployments where multiple instances of the 5GMSd AF expose the Media Session Handling APIs at M5, the 5G System may use a suitable mechanism (e.g. HTTP load balancing or DNS resolution) to direct requests to a suitable AF instance.

In one or more examples, when the UE receives the split-rendering configuration, the UE uses the information to contact the 5GMS AS SRF 505A to set up the split rendering. The UE SRC 510A uses the splitRenderingConfiguraturation to send the UE's media capabilities to the SRF 505A. If SRF 505A can initialize a split-rendering process that can accommodate the UE's capabilities, the SRF 505A acknowledges the new media entry point. These procedures may be performed over the SR-4 interface.

In one or more examples, the HTTP POST may be used as the default protocol for initiating the split rendering request. In this case, the SRC 510A may include the UE's media capabilities in the HTTP POST body. The default format for the body may be JSON defined in MeCAR. If the procedure is successful, the SRF 510A may respond with a 200 (OK) response message and include the media entry point in the body of the message. If the procedure is not successful, the SRF 510 shall provide a response code indicating a rejection of the negotiation.

Figure 9:
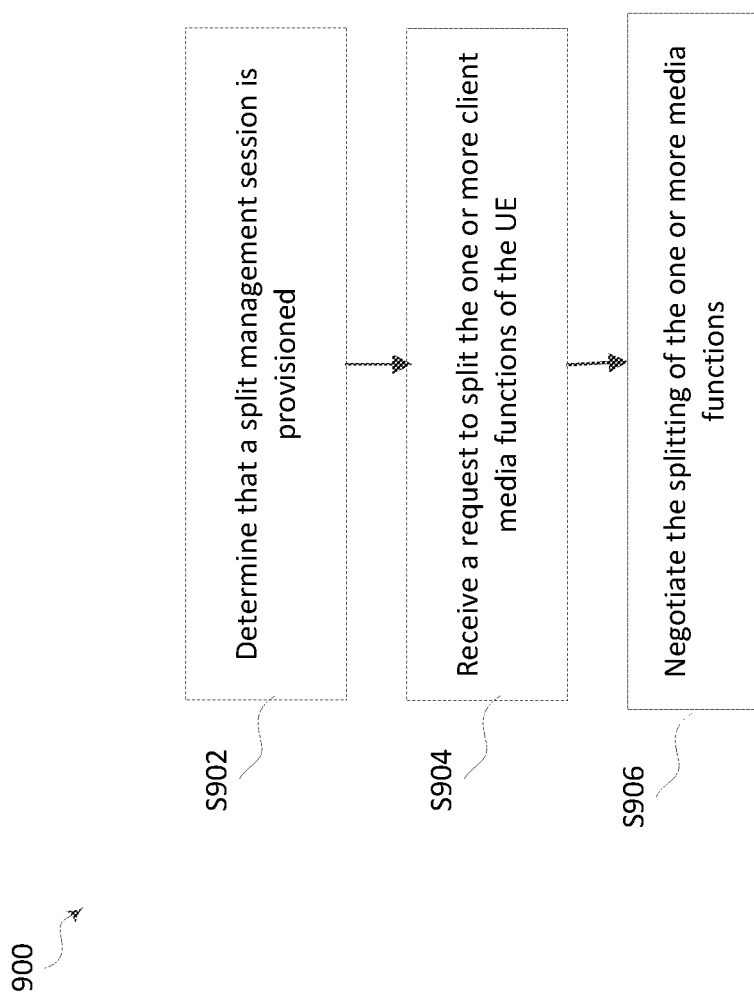
FIG. 9 is flow chart of an example process using a split management architecture, according to embodiments.

FIG. 9 is a flow chart of an example process 900 performed by either the SRC or the SRF. The process may be performed by the SRC 510A (FIG. 6), SRC 704B (FIG. 7), SRF 505A (FIG. 6), or the SRF 806A (FIG. 8).

The process may start at operation S902 where it is determined that a split management session is provisioned. The provisioning of the split management session may be performed in accordance with operation 712 (FIG. 7) or operation 812 (FIG. 8).

The process proceeds to operation S904 where a request to split one or more client media functions is received. The request may be performed in accordance with operation 716 (FIG. 7) or operation 818 (FIG. 8).

The process proceeds to operation S906, where the split of the one or more client media functions is performed between the SRC and the SRF. The negotiation may be performed in accordance with operation 724 (FIG. 7) or operation 822 (FIG. 8). The negotiation may be based on the determined client media capabilities (e.g., operations 718 or 820), and determined capabilities of a 5GMS AS (e.g., operation 722 or 816).

According to one or more embodiments, a method for managing the splitting of the client's media functions between the device and network edge computing resources in which the functions are embedded in the 5G media streaming architecture, in which these functions extend the 5G media streaming architecture APIs to include the interfaces needed for split-rendering configuration, in which interfaces are defined for retrieving the device capabilities, the network computing capabilities, and interface for provision the split management session as well as directing and managing the process by the application on the client or by the Application Service Provider on the network, or delegating the responsibility to the corresponding entities on device and network, in which static and dynamic split management can be performed depending the need of media delivery session.

According to one or more embodiments, a procedure for managing the splitting of the client's media functions between the device and network edge computing resources in the 5G media streaming architecture, driven by the client on the device, which after seeing a provisioned split management session, the application request the client to start the split. The device's split-rendering client negotiates with the split-rendering function on the network, to determine the best realization of the split-rendering. After reaching an agreement, the split-rendering function starts the media split-rendering process on the network and informed the client how to access the split-rendering process on the network, where the client starts the media delivery, by requesting the media from the split-rendering on the network and continues the media delivery.

According to one or more embodiments, a procedure for managing the splitting of the client's media functions between the device and network edge computing resources in 5G media streaming architecture, driven by the network, which after seeing a provisioned split management session, the split render function on network discovery the network Application Server's media capabilities. Then it contacts the split-rendering client on the device's split-rendering client and negotiates the best realization of the split the client functions into two parts, network, and device. After reaching an agreement, the split-rendering function starts the media split-rendering process on the network and informed the client how to access the split-rendering process on the network, where the client starts the media delivery, by requesting the media from the split-rendering on the network and continues the media delivery.

According to one or more embodiments, the procedures and data structures for split-rendering provisioning APIs are defined such that an Application service provider can request to set up split-rendering for any 5G media streaming application through the M1 interface, in which the creation, update, retrieval and delete of the resource is provided.

According to one or more embodiments, the procedure and data structures for providing the split-rendering instantiation information through service access information are provided by this innovation, in which the protocol, the format, and the address of the Application service split-rendering function are added to the service access information, in which the client may use such information to instantiate the split-rendering function in the application server.

According to one or more embodiments, a simple negotiation procedure to instantiate the split-rendering function is provided, in which the client provides its capabilities through a default HTTP POST API using JSON objects describing the media capabilities of the client and the application servers' split-rendering function decides whether it can accommodate a split-rendering for such client and if so, acknowledges the service by providing the media service entry.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above may be implemented as computer software using computer-readable instructions and physically stored in one or more computer-readable media.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The above disclosure also encompasses the embodiments listed below:

(1) A method performed by at least processor for managing a splitting of one or more media functions of a client of a user equipment (UE) with a 5G media streaming (5GMS) application server (AS), the method comprising: determining that a split management session is provisioned, in which the split management session is provisioned over a first split-rendering interface that is an extension of a M1 interface; receiving, over a second split-rendering interface that is an extension of a M4 interface, a request to split the one or more client media functions of the UE; and negotiating, over the second split-rendering interface between a split-rendering client of the UE and a split-rendering function of the 5GMS AS, the splitting of the one or more media functions, in which the negotiating is based on (i) one or more client media capabilities of the UE determined using a third split-rendering interface between the split-rendering client and a function on the UE indicating the one or more client media capabilities, and (ii) one or more network capabilities of the 5GMS AS determined using a fourth split-rendering interface between the split-rendering function and a function on the 5GMS AS indicating the one or more network capabilities.
(2) The method according to feature (1), in which the provisioning of the split-management session is included in service access information provided from a 5GMS application provider to a 5GMS Aware Application of the UE.
(3) The method according to feature (2), further comprising: receiving, by the split-rendering client from the 5GMS aware application over a fifth split-rendering interface that is an extension of a M7 interface, a request for splitting the one or more media functions.
(4) The method according to feature (3), in which the negotiating is initiated by the split-rendering client in which the request to split the one or more client media functions received over the second split-rendering interface is transmitted from the split-rendering client to the split-rendering function based on the request received over the fifth split-rendering interface.
(5) The method according to feature (4), further comprising: transmitting, from the split-rendering client to the 5GMS Aware Application over the fifth split-rendering interface after the negotiating, an acknowledgment that the negotiation of the one or more client media functions has been performed.
(6) The method according to any one of features (1)-(5), in which the provisioning of the split-management session is communicated between a 5GMS application function (AF) and the 5GMS AS over a sixth split-rendering interface that is an extension of a M3 interface.
(7) The method according to feature (6), in which the one or more network capabilities of the 5GMS AS determined using the fourth split-rendering interface is performed based on the communication of the provisioning of the split-management session over the sixth split-rendering interface.
(8) The method of feature (6) or (7), in which the negotiating is initiated by the network in which the request to split the one or more client media functions received over the second split-rendering interface is transmitted from the split-rendering function to the split-rendering client based on the communication of the provisioning of the split-management session over the sixth split-rendering interface.
(9) The method of any one of features (1)-(8), in which the negotiated split of the one or more client media functions is a static split that is not updated after the negotiated split is performed.
(10) The method of any one of features (1)-(9), in which the negotiated split of the one or more client media functions is a dynamic split that is updated after the negotiated split is performed.
(11) The method of any one of features (2)-(10), in which the provisioning of the split-management session further includes creating a new split-rendering configuration between the 5GMS application provider and a 5GMS application function (AF).
(12) The method of feature (11), in which upon a successful creation of the split-rendering configuration, the 5GMS application provider retrieves the split-management session from the 5GMS AF.
(13) The method of feature (11) or feature (12), in which after the split-rendering configuration is created, the 5GMS application provider initiates an update procedure with the 5GMS AF to update the split-rendering configuration.
(14) The method of any one of features (11)-(13), in which after the split-rendering configuration is created, the 5GMS application provider initiates a delete procedure with the 5GMS AF to delete the split-rendering configuration.
(15) The method of any one of features (2)-(14), in which the service access information specifies one or more of a protocol, format, and an address of the split-rendering function to instantiate the split-rendering function in the 5GMS AS.
(16) The method of feature (15), in which the split-rendering function is instantiated via a HTTP POST API using one or more javascript object notation (JSON) objects describing the one or more client media capabilities of the UE.
(17) The method according to feature (16), in which when it is determined that the split of the one or more client media functions can be accommodated, the split-rendering client receives from the split-rendering function a media service entry point.
(18) The method according to feature (17), in which a media delivery session using the media service entry point is started after the split of the one or more client media functions is negotiated.
(19) An apparatus for managing a splitting of one or more media functions, the apparatus comprising: at least one memory configured to store program code; and at least one processor configured to read the program code and operate as instructed by the program code, the program code including: determining code configured to cause the at least one processor to determine that a split management session is provisioned, in which the split management session is provisioned over a first split-rendering interface that is an extension of a M1 interface, receiving code configured to cause the at least one processor to receive, over a second split-rendering interface that is an extension of a M4 interface, a request to split the one or more client media functions of the UE; and negotiating code configured to cause the at least one processor to negotiate, over the second split-rendering interface between a split-rendering client of the UE and a split-rendering function of the 5GMS AS, the splitting of the one or more media functions, in which the negotiating is based on (i) one or more client media capabilities of the UE determined using a third split-rendering interface between the split-rendering client and a function on the UE indicating the one or more client media capabilities, and (ii) one or more network capabilities of the 5GMS AS determined using a fourth split-rendering interface between the split-rendering function and a function on the 5GMS AS indicating the one or more network capabilities.
(20) A non-transitory computer readable medium having instructions stored therein, which when executed by a processor cause the processor to execute a method for managing a splitting of one or more media functions of a client of a user equipment (UE) with a 5G media streaming (5GMS) application server (AS), the method comprising: determining that a split management session is provisioned, in which the split management session is provisioned over a first split-rendering interface that is an extension of a M1 interface; receiving, over a second split-rendering interface that is an extension of a M4 interface, a request to split the one or more client media functions of the UE; and negotiating, over the second split-rendering interface between a split-rendering client of the UE and a split-rendering function of the 5GMS AS, the splitting of the one or more media functions, in which the negotiating is based on (i) one or more client media capabilities of the UE determined using a third split-rendering interface between the split-rendering client and a function on the UE indicating the one or more client media capabilities, and (ii) one or more network capabilities of the 5GMS AS determined using a fourth split-rendering interface between the split-rendering function and a function on the 5GMS AS indicating the one or more network capabilities.

What is claimed is:

1. A method performed by at least processor for managing a splitting of one or more media functions of a client of a user equipment (UE) with a 5G media streaming (5GMS) application server (AS), the method comprising:
determining that a split management session is provisioned, wherein the split management session is provisioned over a first split-rendering interface that is an extension of a M1 interface;
receiving, over a second split-rendering interface that is an extension of a M4 interface, a request to split the one or more client media functions of the UE; and
negotiating, over the second split-rendering interface between a split-rendering client of the UE and a split-rendering function of the 5GMS AS, the splitting of the one or more media functions, wherein the negotiating is based on (i) one or more client media capabilities of the UE determined using a third split-rendering interface between the split-rendering client and a function on the UE indicating the one or more client media capabilities, and (ii) one or more network capabilities of the 5GMS AS determined using a fourth split-rendering interface between the split-rendering function and a function on the 5GMS AS indicating the one or more network capabilities.

2. The method according to claim 1, wherein the provisioning of the split-management session is included in service access information provided from a 5GMS application provider to a 5GMS Aware Application of the UE.

3. The method according to claim 2, further comprising:
receiving, by the split-rendering client from the 5GMS aware application over a fifth split-rendering interface that is an extension of a M7 interface, a request for splitting the one or more media functions.

4. The method according to claim 3, wherein the negotiating is initiated by the split-rendering client in which the request to split the one or more client media functions received over the second split-rendering interface is transmitted from the split-rendering client to the split-rendering function based on the request received over the fifth split-rendering interface.

5. The method according to claim 4, further comprising:
transmitting, from the split-rendering client to the 5GMS Aware Application over the fifth split-rendering interface after the negotiating, an acknowledgment that the negotiation of the one or more client media functions has been performed.

6. The method according to claim 1, wherein the provisioning of the split-management session is communicated between a 5GMS application function (AF) and the 5GMS AS over a sixth split-rendering interface that is an extension of a M3 interface.

7. The method according to claim 6, wherein the one or more network capabilities of the 5GMS AS determined using the fourth split-rendering interface is performed based on the communication of the provisioning of the split-management session over the sixth split-rendering interface.

8. The method of claim 6, wherein the negotiating is initiated by the network in which the request to split the one or more client media functions received over the second split-rendering interface is transmitted from the split-rendering function to the split-rendering client based on the communication of the provisioning of the split-management session over the sixth split-rendering interface.

9. The method of claim 1, wherein the negotiated split of the one or more client media functions is a static split that is not updated after the negotiated split is performed.

10. The method of claim 1, wherein the negotiated split of the one or more client media functions is a dynamic split that is updated after the negotiated split is performed.

11. The method of claim 2, wherein the provisioning of the split-management session further includes creating a new split-rendering configuration between the 5GMS application provider and a 5GMS application function (AF).

12. The method of claim 11, wherein upon a successful creation of the split-rendering configuration, the 5GMS application provider retrieves the split-management session from the 5GMS AF.

13. The method of claim 11, wherein after the split-rendering configuration is created, the 5GMS application provider initiates an update procedure with the 5GMS AF to update the split-rendering configuration.

14. The method of claim 11, wherein after the split-rendering configuration is created, the 5GMS application provider initiates a delete procedure with the 5GMS AF to delete the split-rendering configuration.

15. The method of claim 2, wherein the service access information specifies one or more of a protocol, format, and an address of the split-rendering function to instantiate the split-rendering function in the 5GMS AS.

16. The method of claim 15, wherein the split-rendering function is instantiated via a HTTP POST API using one or more javascript object notation (JSON) objects describing the one or more client media capabilities of the UE.

17. The method according to claim 16, wherein when it is determined that the split of the one or more client media functions can be accommodated, the split-rendering client receives from the split-rendering function a media service entry point.

18. The method according to claim 17, wherein a media delivery session using the media service entry point is started after the split of the one or more client media functions is negotiated.

19. An apparatus for managing a splitting of one or more media functions, the apparatus comprising:
at least one memory configured to store program code; and
at least one processor configured to read the program code and operate as instructed by the program code, the program code including:
determining code configured to cause the at least one processor to determine that a split management session is provisioned, wherein the split management session is provisioned over a first split-rendering interface that is an extension of a M1 interface,
receiving code configured to cause the at least one processor to receive, over a second split-rendering interface that is an extension of a M4 interface, a request to split the one or more client media functions of the UE; and negotiating code configured to cause the at least one processor to negotiate, over the second split-rendering interface between a split-rendering client of the UE and a split-rendering function of the 5GMS AS, the splitting of the one or more media functions, wherein the negotiating is based on (i) one or more client media capabilities of the UE determined using a third split-rendering interface between the split-rendering client and a function on the UE indicating the one or more client media capabilities, and (ii) one or more network capabilities of the 5GMS AS determined using a fourth split-rendering interface between the split-rendering function and a function on the 5GMS AS indicating the one or more network capabilities.

20. A non-transitory computer readable medium having instructions stored therein, which when executed by a processor cause the processor to execute a method for managing a splitting of one or more media functions of a client of a user equipment (UE) with a 5G media streaming (5GMS) application server (AS), the method comprising:

determining that a split management session is provisioned, wherein the split management session is provisioned over a first split-rendering interface that is an extension of a M1 interface;

receiving, over a second split-rendering interface that is an extension of a M4 interface, a request to split the one or more client media functions of the UE; and negotiating, over the second split-rendering interface between a split-rendering client of the UE and a split-rendering function of the 5GMS AS, the splitting of the one or more media functions, wherein the negotiating is based on (i) one or more client media capabilities of the UE determined using a third split-rendering interface between the split-rendering client and a function on the UE indicating the one or more client media capabilities, and (ii) one or more network capabilities of the 5GMS AS determined using a fourth split-rendering interface between the split-rendering function and a function on the 5GMS AS indicating the one or more network capabilities.

* * * * *